(12) United States Patent
Motokawa

(10) Patent No.: US 6,498,298 B2
(45) Date of Patent: Dec. 24, 2002

(54) WIRE HARNESS

(75) Inventor: Masatomo Motokawa, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/858,567

(22) Filed: May 17, 2001

(65) Prior Publication Data
US 2002/0023770 A1 Feb. 28, 2002

(30) Foreign Application Priority Data
May 25, 2000 (JP) ........................................ 2000-155036
Jul. 26, 2000 (JP) ........................................ 2000-225455

(51) Int. Cl.⁷ ................................................ H02G 3/00
(52) U.S. Cl. ................ 174/72 A; 174/99 R; 174/117 A; 156/86; 428/34.9; 428/343
(58) Field of Search .......................... 174/72 A, 68.3, 174/69, 99 R, 107, 110 SR, 117 A, DIG. 8; 361/826; 156/84, 86; 428/34.9, 343

(56) References Cited

U.S. PATENT DOCUMENTS 4,992,331 A * 2/1991 DeCoste, Jr. ................ 428/354
6,217,376 B1 * 4/2001 Morita ........................ 439/519

* cited by examiner

Primary Examiner—Anthony Dinkins
Assistant Examiner—W. David Walkenhorst
(74) Attorney, Agent, or Firm—Oliff & Berridge, PLC

(57) ABSTRACT

There is provided a wire harness including a bundle of electric wires round which an adhesive tape made of resin composition, the principal component of which is polyolefine, the coefficient of heat-contraction against adhesion at 180° C. of which is not less than 30%, is wound.

7 Claims, 3 Drawing Sheets

A PART SECTIONAL VIEW

WIRE HARNESS

BACKGROUND OF THE INVENTION

1. Field of the Invention

The present invention relates to a wire harness for use in an automobile or the like.

2. Description of the Related Art

A wire harness has been used for a wiring arranged in an automobile. The wire harness is also referred to as assembled electric wires, which are formed in such a manner that a plurality of electric wires are assembled in advance into one body so that the electric wires can be formed into a shape necessary for wiring. As shown in FIG. 1, after necessary branches have been formed in the wire harness and necessary connectors have been attached to the end portions of the wire harness, a tape is wound around the bundle of electric wires. PVC insulating electric wires have been used for the electric wires, and PVC tapes having an adhesive have been widely used for the tapes.

The wire harness as described above is used for air planes and electric appliances, such as video tape players.

Concerning the PVC insulating electric wires which have been widely used as insulating electric wires, it has recently become necessary to make investigation into a substitute so that the environmental problems can be solved.

As a substitute for PVC insulating electric wires, it has been proposed to use insulating electric wires made of non-halogen fire-resistant polyolefine in which a large quantity of inorganic filler is added to polyolefine.

According to the thus made investigation, it has become necessary to reinvestigate PVC tapes used for the wire harness.

Even after the PVC tapes are assembled into the wire harness, it is necessary that the PVC tapes have a fire-resistance property. If it is possible to use tapes made of non-halogen fire-resistant polyolefine which are recommended as the wire harness tapes, any problems would not be caused. However, in order to enhance the fire-resistance property, a large quantity of inorganic filler has to be added to non-halogen fire-resistant polyolefine. Therefore, it is very difficult to make thin tapes of non-halogen fire-resistant polyolefine, and further the manufacturing costs of the tapes are raised in such a case.

SUMMARY OF THE INVENTION

The present inventors have found that, even if combustible material is used for a tape, as long as the tape is made thin and elongated, it can be judged to be self-extinguishable in a combustion test stipulated in JIS C3005 after the tape is assembled into a wire harness. The present invention has been accomplished on the basis of the above knowledge.

According to the present invention, there is provided a wire harness including a bundle of electric wires round which an adhesive tape made of resin composition, the principal component of which is polyolefine, the coefficient of heat-contraction against adhesion at 180° C. of which is not less than 30%, is wound.

According to the present invention, there is provided a wire harness in which the maximum value of the width of an opening on the tape is not less than one third of the entire circumference of the portion concerned of the wire harness when the wire harness is heated.

DETAILED DESCRIPTION OF THE PRESENT INVENTION

Figure 1:
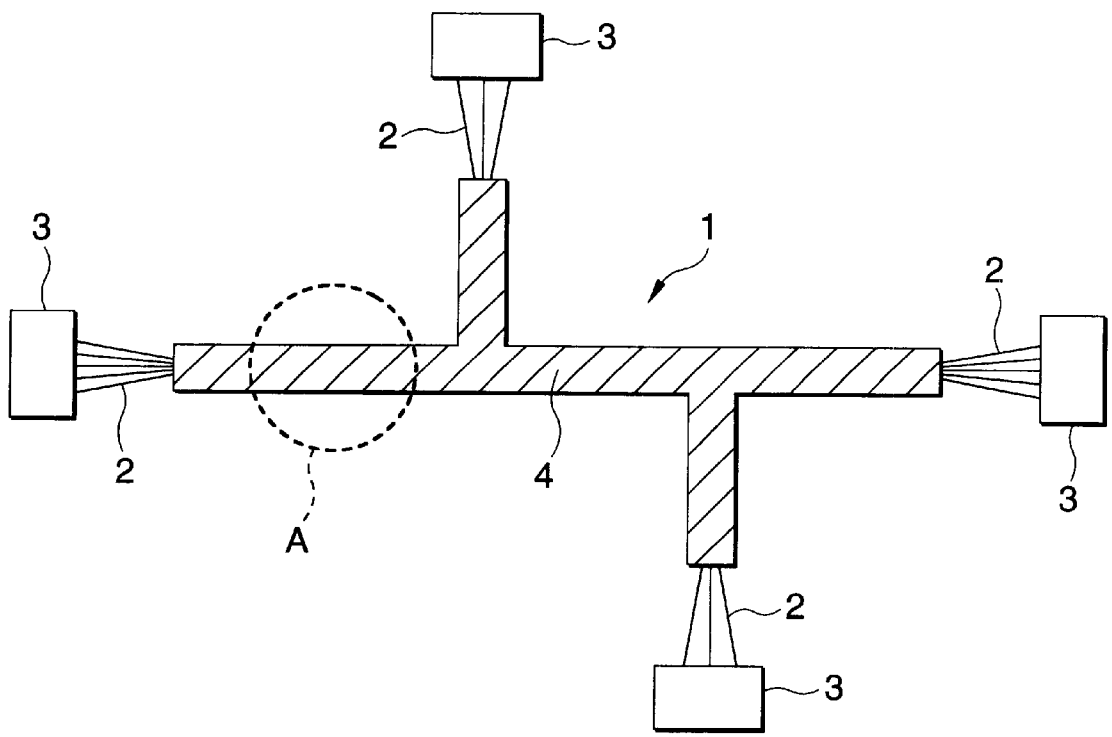
FIG. 1 is an appearance view of the wire harness of the present invention.

FIG. 1 is a view showing an embodiment of the present invention. Referring to FIG. 1, the present invention will be described below.

FIG. 1 is a view showing an appearance of a wire harness. Reference numeral 1 is an overall wire harness, reference numeral 2 is a bundle of electric wires, reference numeral 3 is a connector attached to end portions of the electric wires, and reference numeral 4 is a tape to bundle the electric wires.

It is convenient to use an adhesive tape for assembling the wire harness.

Examples of the usable tape material are resin compositions, the principal component of which polyolefine such as polyethylene, polypropylene, ethylene vinyl acetate copolymer and ethylene ethyl acrylate copolymer.

The tape is manufactured as follows. Resin martial is subjected to the processes of the common T-die extrusion, inflation and calendar so as to make a film, and the thus obtained film is slit to a predetermined width. In the present invention, it is necessary that the tape is thin, that is, it is preferable that the thickness is not more than 0.1 mm. Also, it is preferable that the tape is substantially elongated in the longitudinal direction and that the coefficient of heat-contraction against adhesion, which will be described later, is high.

The coefficient of heat-contraction against adhesion described in the present invention is found by the following steps.

Step 1:

An adhesive face of an adhesive tape is directed to an aluminum plate side, and the adhesive tape is made to adhere onto the aluminum plate.

Step 2:

Two reference lines are marked on a surface of the adhesive tape at an interval of 200 mm.

Step 3:

Heating is conducted at 180° C. for 30 minutes.

Step 4:

After the completion of heating, the interval between the two reference lines is measured.

Then, the coefficient of heat-contraction against adhesion is defined as follows. (Coefficient of heat-contraction against adhesion)(%)={(Interval between reference lines before heating)−(Interval between reference lines after heating)}÷(Interval between reference lines before heating)×100

The reason why it is necessary to use a tape having a thickness being small and a coefficient of heat-contraction against adhesion being high is described as follows. When a wire harness is assembled with the tape satisfying the above condition, the assembled wire harness can be judged to be self-extinguishable in the combustion test stipulated in JIS C3005.

It is also preferable that t.he width of an opening is large when it is wound round a bundle of electric wires and finished into a wire harness and heated.

The width of an opening on the tape, the opening being formed by notching and heating, is found by the following steps.

Figure 5:
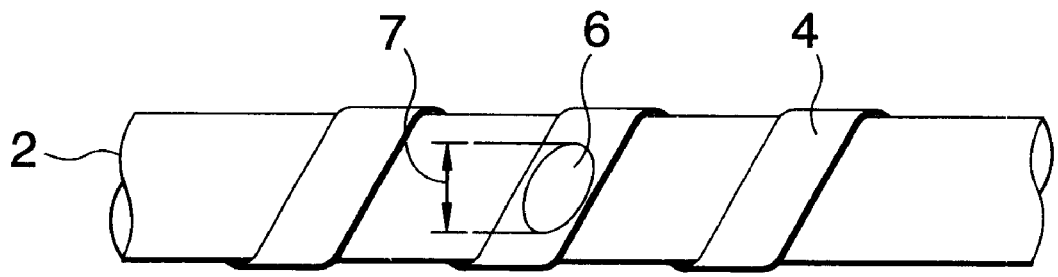
FIG. 5 is a view showing an example of an opening of a tape formed by heating.

Step 1:

As shown in FIG. 5, a notch 5 having a length of 30 mm is formed with a razor blade on the tape in the longitudinal direction of the wire harness.

Step 2:

The entire wire harness is heated at 180° C. for 30 minutes.

Step 3:

The tape is contracted and the notch 5 is open into a window-shape. The width of a portion from which a bundle of electric wires are exposed is measured.

It is preferable to use a wire harness having the width of the opening on the tape being large when the wire harness is heated after it is notched. The reason is that, even if a combustible tape is used as a tape to be wound round a bundle of electric wires, as long as incombustible insulating electric wires are used for the wire harness, when the width of the opening on the tape is large in the case where the tape is heated, the tape is judged to be self-extinguishable in the combustion test stipulated in JIS C3005. Especially when the maximum value of the width of the opening on the tape formed by heating is not less than one third of the entire circumference of the portion concerned of the wire harness, the flames seldom spread to other portions of the wire harness, which is very preferable.

EXAMPLE 1

Resin composition, the principal component of which is polypropylene, was subjected to T-die extrusion, so that it was substantially elongated in the longitudinal direction by 200% so as to make a film, the thickness of which was 50 μm. A mold releasing agent, the principal component of which was silicon, was coated on one face of this film by several μm, and adhesive, the principal component of which was EVA, was coated on the other face by 10 μm. The thus obtained tape was slit into the width of 20 mm. In this way, an adhesive tape was made.

The coefficient of heat-contraction against adhesion of this tape was 52%.

Figure 2:
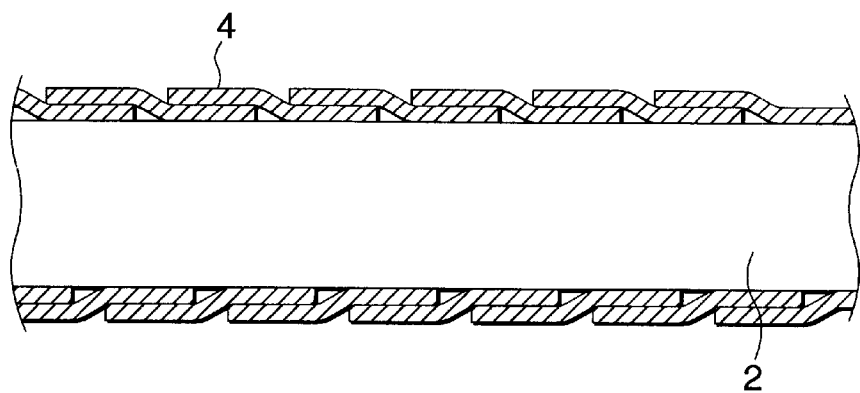
FIG. 2 is a cross-sectional view of portion A in FIG. 1.

Twenty pieces of insulating electric wires were bundled, wherein each electric wire was composed of a copper wire, the outer diameter of which was 0.8 mm, and covered with a layer of non-halogen fire-resistant polyolefine, the thickness of which was 0.4 mm. The above adhesive tape, the adhesive side of which was directed inside, was wound round the outer circumference of the bundle of electric wires in a half wrapping condition as shown in FIG. 2. In this way, a wire harness model was obtained.

This wire harness model was subjected to the combustion test stipulated in JIS C3005. As a result of the test, the wire harness model was judged to be self-extinguishable in both the horizontal test and the oblique test.

Figure 3:
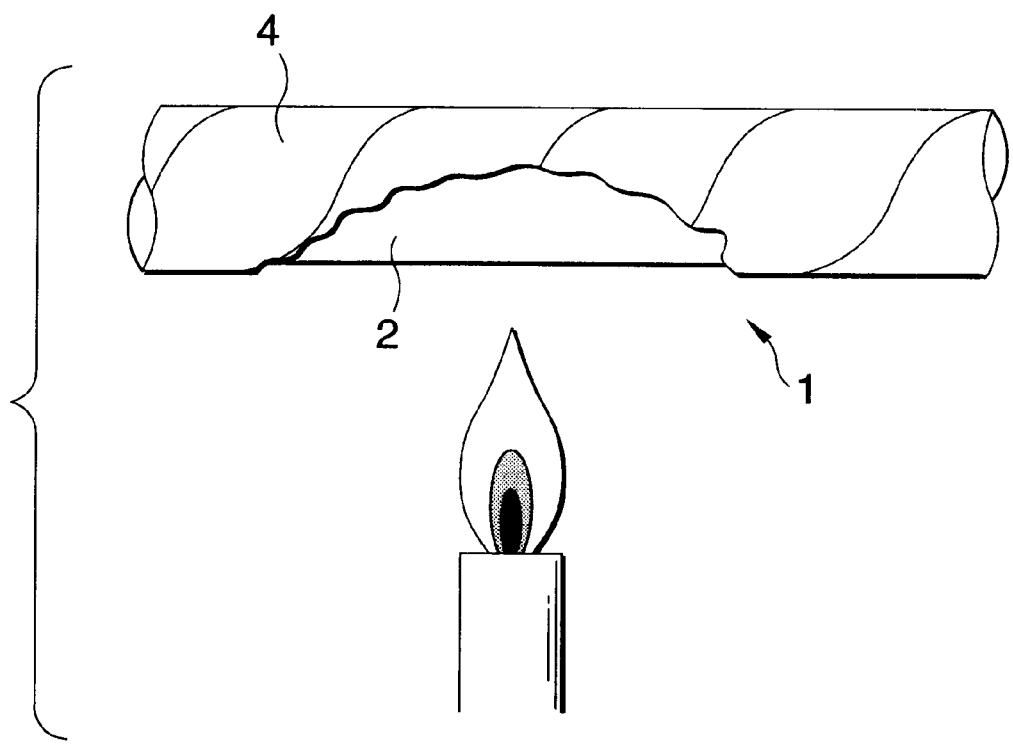
FIG. 3 is a view showing circumstances of a combustion test (horizontal test) conducted in an embodiment.
Figure 4:
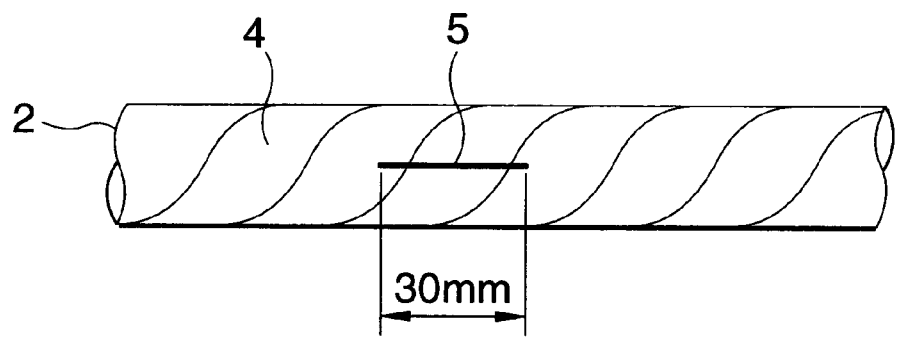
FIG. 4 is a view showing circumstances of a notch formed by a razor blade.

FIG. 3 is a view showing a circumstance of the combustion test (horizontal test) made in the embodiment.

COMPARATIVE EXAMPLE 1

The coefficient of heat-contraction against adhesion of non-woven fabric obtained on the market was measured. The result of the measurement was 13%. The same wire harness model as that of the embodiment of the present invention was made using this tape, and the combustion test stipulated in JIS C3005 was conducted. As a result of the test, the flames spread very widely in both the horizontal test and the oblique test. Therefore, it was impossible to judge that the tape model was self-extinguishable.

COMPARATIVE EXAMPLE 2

The coefficient of heat-contraction against adhesion of Sellotape obtained on the market was measured. The result of the measurement was 2%. The same wire harness model as that of the embodiment of the present invention was made using this tape, and the combustion test stipulated in JIS C3005 was conducted. As a result of the test, the flames spread very widely in both the horizontal test and the oblique test. Therefore, it was impossible to judge that the tape model was self-extinguishable.

COMPARATIVE EXAMPLE 3

The coefficient of heat-contraction against adhesion of a paper adhesive tape obtained on the market was measured. The result of the measurement was approximately 0%. The same wire harness model as that of the embodiment of the present invention was made using this tape, and the combustion test stipulated in JIS C3005 was conducted. As a result of the test, the flames spread very widely in both the horizontal test and the oblique test. Therefore, it was impossible to judge that the tape model was self-extinguishable.

EXAMPLE 2

Twenty insulating electric wires of copper, the outer diameter of each insulating electric wire being 0.8 mm, each insulating electric wire being covered with non-halogen incombustible polyolefine of 0.4 mm thickness, were bundled, and various adhesive tapes were wound round the outer circumference of the thus bundled insulating electric wires in such a manner that the adhesive face of each adhesive tape was set inside and the adhesive tapes were wound in the manner of half-overlap as shown in FIG. 2. In this way, the wire harness models were prepared.

In this case, the following adhesive tapes were used. (1) Elongated tape of polypropylene, (2) Non-woven fabric tape, (3) Cellophane tape, and (4) Paper tape With respect to these wire harness models, the width of the opening on the tape formed by heating was measured, and the combustion test stipulated by JIS C3005 was conducted.

FIG. 3 is a view showing circumstances of the horizontal combustion test.

The width of the opening on the tape formed by heating and the result of the combustion test stipulated by JIS C3005 are described as follows.

Although the tapes were wound round the bundle of electric wires in the manner of half-overlap so that the bundle of electric wires could not be exposed, in the case of an elongated tape of polypropylene, the tape was contracted in the width direction of the tape when it was heated at 180° C. for 30 minutes. Therefore, as shown in FIG. 5, as if the tapes were roughly wound around the bundle of electric wires, gaps were formed between the tapes, and the bundle of electric wires were exposed outside. The notch 5 formed by a razor blade was open as shown by the reference numeral 6 in FIG. 5. The size of this opening was measured so as to obtain the width of the opening on the tape formed by heating. As shown by the reference numeral 7 in FIG. 5, the maximum value in the circumferential direction of the wire harness was determined to be the maximum value. As a result, the maximum value of the width of the opening on the tape was 42% of the entire circumference of this portion of the wire harness.

On the other hand, in the combustion test, no flames spread in both the horizontal test and the inclination test. Therefore, it was judged to be self-extinguishable.

Figure 6:
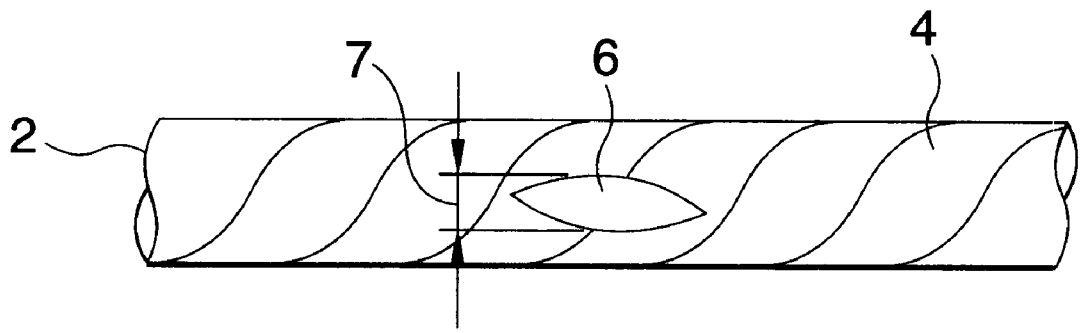
FIG. 6 is a view showing another example of an opening of a tape formed by heating.

In the case of a non-woven fabric tape, the test results were as follows. When the entire wire harness was heated at 180° C. for 30 minutes, the notch 5 was opened while the state of half-overlap was being kept as shown in FIG. 6. The maximum value 7 of the width of the opening of the tape formed by heating was 17% of the entire circumference of the portion concerned of the wire harness.

On the other hand, in the combustion test, the flames spread widely in both the horizontal test and the inclination test. Therefore, it was not judged to be self-extinguishable.

In the case of a cellophane tape, the test results were as follows. When the entire wire harness was heated at 180° C. for 30 minutes, in the same manner as that of the non-woven fabric tape, the notch was opened while the state of half-overlap was being kept as shown in FIG. 6. The maximum value 7 of the width of the opening of the tape formed by heating was 2% of the entire circumference of the portion concerned of the wire harness.

On the other hand, in the combustion test, the flames spread widely in both the horizontal test and the inclination test. Therefore, it was not judged to be self-extinguishable.

In the case of a paper tape, the width of the opening caused by heating was substantially zero. In the combustion test, the flames spread widely in both the horizontal test and the inclination test. Therefore, it was not judged to be self-extinguishable.

As explained above, only in the case of a wire harness composed of a bundle of electric wires round which an adhesive tape made of resin composition, the principal component of which is polyolefine, the coefficient of heat-contraction against adhesion at 180° C. of which is not less than 30%, is wound, it is possible to provide a self-extinguishable wire harness. Since the tape is made of polyolefine, environmental countermeasures can be easily taken. Therefore, industrial possibility of the wire harness of the present invention is very high.

As explained above, in the case of a wire harness in which the maximum value of the width of the opening on the tape caused by heating is not less than one third of the entire circumference of the portion concerned of the wire harness in which the opening is formed, even when a tape made of combustible material such as polyolefine is wound round the bundle of electric wires, the entire wire harness is self-extinguishable. From the viewpoint of solving the environmental problems, it is very preferable that the tape made of polyolefine can be used. Accordingly, the wire harness of the present invention can provide very high industrial advantages.

What is claimed is:

1. A wire harness comprising:
   a bundle of electric wires; and
   an adhesive tape made of a resin composition containing polyolefine, the adhesive tape wound around the bundle of electric wires,
   wherein the adhesive tape is characterized by a coefficient of heat-contraction against adhesion at 180° C. that is not less than 30%.

2. The wire harness according to claim 1, wherein the thickness of the adhesive tape is not more than 0.1 mm.

3. The wire harness according to claim 1, wherein the maximum value of the width of an opening of a notch formed on the tape is not less than one third of the entire circumference of a portion of the wire harness where the notch is formed, when the notch is formed on the tape in the longitudinal direction and the wire harness is heated.

4. A wire harness comprising:
   a bundle of electric wires; and
   an adhesive tape wound around the bundle of electric wires,
   wherein the maximum value of the width of an opening of a notch formed on the tape is not less than one third of the entire circumference of a portion of the wire harness where the notch is formed, when the notch is formed on the tape in the longitudinal direction and the wire harness is heated.

5. The wire harness according to claim 4, wherein the thickness of the adhesive tape is not more than 0.1 mm.

6. The wire harness according to claim 4, wherein the adhesive tape is made of a resin composition containing polyolefine.

7. The wire harness according to claim 4, wherein the adhesive tape is characterized by a coefficient of heat-contraction against adhesion at 180° C. that is not less than 30%.

* * * * *